United States Patent [19]
Marvel

[11] 3,959,803
[45] May 25, 1976

[54] INSTANTANEOUS PHOTOGRAPHY CAMERA

[76] Inventor: Fred D. Marvel, 1417 E. 2nd St., Tulsa, Okla. 74101

[22] Filed: Dec. 9, 1974

[21] Appl. No.: 530,599

[52] U.S. Cl. .............................. 354/105; 354/125
[51] Int. Cl.² ........................................ G03B 17/00
[58] Field of Search ........... 354/105, 106, 107, 108, 354/109, 125

[56] References Cited
UNITED STATES PATENTS 1,991,924   2/1935   Dolan .................................. 354/125

*Primary Examiner*—L. T. Hix
*Assistant Examiner*—Alan Mathews
*Attorney, Agent, or Firm*—Charles S. Holmes

[57] ABSTRACT

Disclosed herein is an improved instantaneous photography camera for use in the manufacture of photographic identification cards. The camera is of the type in which one or more masks are provided within the camera box of the camera to allow the sequential exposure of a portion of photosensitive film to an image containing credit information and an image of the subject of the credit identification to form a photographic identification card.

5 Claims, 1 Drawing Figure

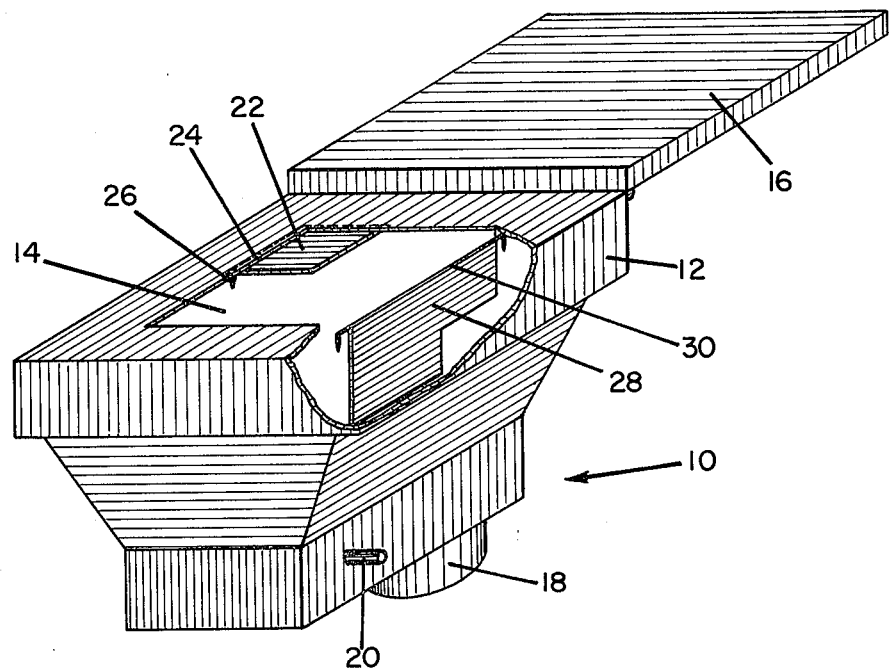
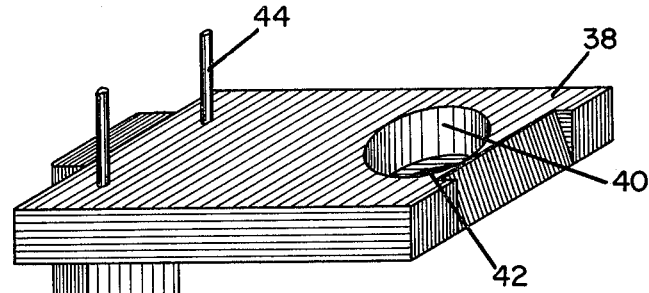
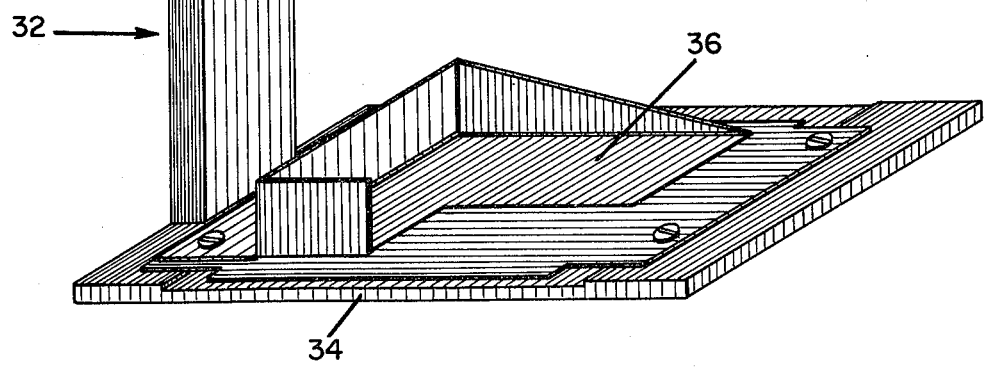

INSTANTANEOUS PHOTOGRAPHY CAMERA

BACKGROUND OF THE INVENTION

The present invention relates to an improved instantaneous photography camera. More particularly, the present invention comprises a multiple masked instantaneous photography camera allowing the image of a subject to be positioned upon a photo identification card in with credit information of the subject.

Instantaneous formation of credit cards is desirable in order to provide an economic means for manufacturing large numbers of credit identification media. Conventional apparatus utilized to provide instantaneous photography generally comprise one or more fixed masks positioned within a camera box with associated lens and shutters assemblies. The masks expose various portions of the photosensitive film within the camera box to light, providing an image of the subject and an image of the subject's credit information to form the photo identification card. In another further form of conventional apparatus photographic masks are placed upon and moved across the photosensitive film in order to provide a means for exposing specific areas of the photographic sensitive film to light imagery card.

Each of the conventional apparatus disclosed and discussed herein exhibit the same inherent problem in that they fail to provide a rapid means for positioning imagery upon a photosensitive film. A further problem is presented in that the movement of a prism, lens or mask about a photosensitive film requires continuing refocusing of the lens in order to gain exact focus of the imagery. What is required is an apparatus which provides instantaneous photographic imagery for photograph identification card usage.

It is an object of the present invention to provide an improved instantaneous photography camera for use in the manufacture of photographic identification cards.

It is further object of the present invention to provide an improved instantaneous photography camera utilizing two masks pivotally positioned within a camera.

It is still a further object of the present invention to provide an improved instantaneous photography camera. Said camera utilizing two pivotally positioned masks contained within a camera box and having means for holding the camera to allow for the positioning of both the subject and his credit information upon a photosensitive film contained within the instantaneous photography camera.

With these and other objects in mind, the present invention may be more readily understood through referral to the accompanying drawing and the following discussion.

SUMMARY OF THE INVENTION

The objects of the present invention are most readily achieved through utilization of apparatus forming an improved instantaneous photography camera for use in the manufacture of photographic identification cards. The improved camera is of the type in which one or more masks are provided within the camera box of the camera to allow the sequential exposure of a portion of the photosensitive film to information and an image of the subject of the credit identification at any moment. The improvement comprising a first mask pivotally positioned within the camera box with its pivotal axis perpendicular to the focal axis of the lens of the camera and being formed adequate weight so as to normally hang in a vertical position when the camera box is held having its lens axis parallel to the horizontal of the ground and so to normally cover a portion of the photosensitive film. The normally covered portion of the photosensitive film is exposed when the camera lens is directed in a vertical position towards the ground. The improvement further comprises a second mask pivotally positioned within the camera box with its pivotal axis parallel to the pivotal axis of the first mask and being counterweighted so as to be normally positioned in a horizontal position when the camera box is held having its lens axis parallel to the ground and so as to normally leave exposed the photosensitive film. The normally exposed portion of the photosensitive film is covered when the camera lens is directed in a vertical position towards the ground.

The first mask may be constructed so as to have the given shape of the credit information to be exposed upon the photosensitive film and the second mask constructed having the general given shape of the subject of the credit identification card. The first and second masks form in combination, the outline of the credit identification card.

In still a further preferred embodiment of the present invention the improved instantaneous photography camera may further comprise means for holding the camera with its lens in a vertical position directed downwardly and for holding the credit information of the subject at the focal distance before the lens of the camera. In general these means may comprise a base having a credit information holder positioned thereon. An upright support is attached to the base and has a camera holder positioned upon the upper portion of the upright support. A lens holder hole passes through the camera hole and is aligned with the credit information holder. In still a further preferred embodiment said lens holder hole has an adapter lens positioned within the lens holder hole so as to provide a focal media for the lens of the instantaneous photography camera when it is positioned therein.

BRIEF DESCRIPTION OF THE DRAWINGS

The object of the present invention may be more readily understood through referral to the accompanying drawing which represents an exploded view of one embodiment of the apparatus of the improved instantaneous photography camera of the present invention.

DETAILED DESCRIPTION OF THE INVENTION

In general, the apparatus of the present invention comprises a camera having the ability of forming a complete image of a photographic identification card upon a photographic print. The camera includes conventional lens and shutter assembly, and strike contained thereon the camera box having film advancement apparatus contained thereon. The apparatus exhibits a focusing ability to allow a predetermined portion of the photosensitive film contained within the camera box to be exposed to an image of a subject of the credit identification. The apparatus further provides a means for positioning credit information thereupon the remaining unexposed portion of the photosensitive film contained within the camera box utilizing the same focusing lens and shutter assembly.

A particular embodiment of the apparatus of the present invention may be more readily depicted through referral to the accompanying drawing. Specifically, the drawing is an exploded view of a preferred embodiment of the apparatus for an improved instantaneous photography camera for positioning a subject and his credit information upon a photosensitive film. Instantaneous photography camera is depicted having camera box 12 with film pack and advancement means 16 contained on a rear portion of camera box 12. The instantaneous photography camera 10 is provided with a standard lens and shutter assembly 18 having a shutter activation knob 20 positioned upon the face of the camera box 12 and in alignment with the shutter of the lens and shutter assembly 18. The camera 10 contains a first mask 28 pivotally positioned within the camera box 12 and of adequate weight so as to normally hang in a vertical position. Therefore when the camera box 12 is held having its lens axis parallel to the horizontal of the ground the first mask 28 normally covers a portion of the photosensitive film. That portion of the photosensitive film is exposed when the camera lens 18 is directed in a vertical position toward the ground. It is preferred that the first mask 28 be constructed of a given shape of the credit information to be exposed upon the photosensitive film and that it be pivotally connected to the camera box 12 through utilization of a pivot arm 30 connected to adjacent sides of the camera box 12. A second mask 22 is provided being pivotally positioned within the camera box 12 through means of pivot arm 24 and being counter-weighted so as to be normally positioned in a horizontal position when the camera box 12 is held having its lens axis 18 parallel to the ground. This positioning normally leaves exposed the photosensitive film contained therein the camera box cavity 14 of the camera box 12 but allows that portion of photosensitive film to be covered when the camera lens 18 is directed in a vertical position toward the ground. The second mask 22 generally has a given shape of the subject of the credit identification card and forms in combination with the first mask the outline of the credit identificatio card. As depicted in this embodiment of the present invention the first mask is formed of a rectangle having a rectangular corner portion thereof removed and the second mask is formed of a rectangle of the size of the portion removed from the first mask so to in combination therewith form a rectangle.

The improved instantaneous photography camera of the present invention may further comprise means for holding the camera 12 with its lens 18 in a vertical position directed downwardly and for holding the credit information of the subject at the focal distance before the lens 18 of the camera 10. In general these means may be provided as depicted in the preferred embodiment shown in the drawing through utilization of a base 34 containing a credit information holder 36 positioned thereon said base and having an upright support 32 connected to said base and extending vertically therefrom. A camera holder 38 is fixed upon the upright support 32 and further having a lens holder hole 40 passing therethrough the camera holder 38. Said hole being aligned with the credit information holder 36 positioned upon the base 34. The improved instantaneous photography camera of the present invention may further comprise an adapter lens 42 positioned within the lens holder hole 40 of the apparatus. Said adapter lens 42 being sized so as to act in combination with lens 18 of the camera 10 to provide a focusing of the credit information contained within the credit information holder 36. The apparatus is further provided with one or more studs 44 which act in combination with the sides of the camera 10 in order to provide a rigid affixation of the camera 10 as it is positioned with the lens 18 contained within the lens holder hole 40 of the camera holder 38.

In the operation of the apparatus of the present invention the improved instantaneous photography camera 10 is first positioned with the axis of the lens 18 being parallel to the ground so that the camera is held in a vertical position with a focusing through the lens and shutter assembly 18 of the image of the subject of the credit identification. In this position the first mask 28 hangs in a vertical position covering a portion of the photosensitive film upon which credit information will be subsequently exposed and the second mask 22 lies in a horizontal position leaving exposed a portion of the photosensitive film upon which the image of the subject is provided. The shutter activation knob 20 is depressed allowing the image of the subject to pass through the lens and shutter assembly 18 and to expose a predetermined portion of the photosensitive film contained within photosensitive film pack 16. Camera 10 is positioned in a horizontal position having the axis of the lens and shutter assembly 18 perpendicular to the ground with the lens and shutter assembly 18 being positioned within a camera holder 18. The lens 18 is passed within the lens holder hole 40 thereof the camera holder 38 and having the positioning studs 44 passed about the exterior of the camera box 12 so as to readily affix the camera 10 to the camera holder 38. Credit identification information is provided within the credit information holder 36 said information being positioned on the credit information card as depicted in the drawing. The information card having a general conformity of the shape of the first mask 28 such that the image which passes through the lens and shutter assembly 18 upon the activation of shutter activation knob 20 will expose that portion of the photosensitive film normally covered by first mask 28. The portion containing the subject image being covered by the second mask 22 held in a horizontal position over the photosensitive film within the photosensitive film pack 16. The credit information is positioned upon the film in conjunction with that portion of the film already exposed and containing the subject's image. Thereafter the credit identifying information is positioned or exposed upon the photosensitive film contained within the camera 10 the photosensitive film is advanced and the instantaneous photograph is withdrawn from the camera and laminated within plastic to produce a photographic identification card. The multiple imagery yields to the operator a single photographic print with distinct images which may be embossed and utilized as a photographic identification card.

The present invention has been described herein with reference to particular embodiments thereof. It will be appreciated, however, by those skilled in the art, that various changes and modifications may be made without departing from the scope of the invention as set forth herein.

Therefore, I claim:

1. An improved instantaneous photography camera for use in the manufacture of photographic identification cards of the type in which one or more masks are provided within the camera box of the camera to allow only a portion of a photosensitive film to be sequentially exposed to an image containing credit information and to an image of the subject of the credit ientification, the improvement comprising:

a. a first mask pivotally positioned within the camera with its pivotal axis perpendicular to the focal axis of the lens of the camera and being formed of adequate weight so as to hang in a vertical position when the camera box is held having its lens axis parallel to the horizontal of the ground and so as to normally cover a portion of the photosensitive film but allow that portion of the photosensitive film to be exposed when the camera lens is directed in a vertical position towards the ground; and b. a second mask pivotally positioned within the camera box with its pivotal axis parallel to the pivotal axis of the first mask and being counter-weighted so as to be normally positioned in a horizontal position when the camera box is held having its lens axis parallel to the ground and so as to normally expose a portion of the photosensitive film but allow that portion of the photosensitive film to be covered when the camera lens is directed in a vertical position toward the ground.

2. The improved instantaneous photography camera of claim 1 in which:

a. the first mask has the given shape of the credit information to be exposed upon the photosensitive film; and b. the second mask has the given shape of the subject of the credit identification card and forms in combination with the first mask, the outline of the credit identification card.

3. The improved instantaneous photography camera of claim 2 further comprising means for holding the camera with its lens in a vertical position directed downwardly and for holding the credit information of the subject at the focal distance before the lens of the camera.

4. The improved instantaneous photography camera of claim 3 in which the means for holding the camera with its lens in a vertical position directed downwardly and for holding the credit information of the subject at the focal distance before the lens of the camera comprise:

a. a base;

b. a credit information holder positioned on said base;

c. an upright support extending vertically from said base, and d. a camera holder positioned upon the upright support and having a lens holder hole passing therethrough, said hole being aligned with the credit information holder.

5. The improved instantaneous photography camera of claim 4 further comprising an adapter lens positioned within the lens holder hole.

* * * * *